United States Patent
Cloyd et al.

[11] Patent Number: 6,125,623
[45] Date of Patent: Oct. 3, 2000

[54] HEAT EXCHANGER FOR OPERATING WITH A COMBUSTION TURBINE IN EITHER A SIMPLE CYCLE OR A COMBINED CYCLE

[75] Inventors: Scott Thorsten Cloyd, Geneva; Scott Cutler Willis, Oviedo, both of Fla.

[73] Assignee: Siemens Westinghouse Power Corporation, Orlando, Fla.

[21] Appl. No.: 09/034,655

[22] Filed: Mar. 3, 1998

[51] Int. Cl.[7] ........................................ F02C 6/00
[52] U.S. Cl. ........................................ 60/39.04; 60/39.182
[58] Field of Search .......................... 60/39.182, 39.141, 60/39.142, 39.04; 122/7 R, 7 B

[56] References Cited

U.S. PATENT DOCUMENTS

| | | |
|---|---|---|
| 2,907,170 | 10/1959 | Zadnik . |
| 3,314,231 | 4/1967 | Hochmuth . |
| 4,424,668 | 1/1984 | Mukherjee ............................ 60/39.182 |
| 4,821,507 | 4/1989 | Bachmann et al. .................. 60/39.182 |
| 4,989,405 | 2/1991 | Duffy et al. ......................... 60/39.182 |
| 5,412,937 | 5/1995 | Tomlinson et al. ................... 60/39.02 |
| 5,493,854 | 2/1996 | Nielsen ................................ 60/39.02 |
| 5,564,269 | 10/1996 | Briesch ............................... 60/39.182 |
| 5,609,019 | 3/1997 | Nielsen .............................. 60/39.182 |
| 5,630,314 | 5/1997 | Kojima et al. ...................... 60/39.182 |
| 5,647,199 | 7/1997 | Smith ................................. 60/39.182 |

FOREIGN PATENT DOCUMENTS

| | | |
|---|---|---|
| 0 309 792 | 4/1989 | European Pat. Off. . |
| 6-093810 | 4/1994 | Japan . |
| 9-088519 | 3/1997 | Japan . |

*Primary Examiner*—Charles G. Freay
*Attorney, Agent, or Firm*—Eckert Seamans Cherin & Mellott, LLC

[57] ABSTRACT

This invention includes a heat exchanger that can be operated with a combustion turbine. This heat exchanger can be operated in either a simple cycle mode of operation or a combined cycle mode of operation. Preferably, the heat exchanger has a first heat transfer stage, a second heat transfer stage, a bypass stack and a damper. The damper and the bypass stack are preferably disposed between the first and the second heat transfer stages. Hot fluid can be received into the heat exchanger from the combustion turbine and directed through the heat transfer stages where heat is transferred from the hot fluid to the cooling medium flowing through the tubes of the heat transfer stages. Preferably, the hot fluid enters the heat exchanger upstream of the first heat transfer stage. After flowing through the first heat transfer stage, the hot fluid can be directed by the damper to either the bypass stack or the second heat transfer stage. The damper may have at least two positions which include a first position and a second position. In the first position, the hot fluid exiting the first heat transfer stage is directed through the bypass stack and does not enter the second heat transfer stage. After flowing through the bypass stack, the hot fluid exhausts to atmosphere. In this position, the heat exchanger is operated in a simple cycle mode of operation. Conversely, when the damper is in the second position, hot fluid exiting the first heat transfer stage is directed to the second heat transfer stage and not through the bypass stack. In this position, steam for operating a steam turbine is produced, and the heat exchanger is operated in the combined cycle mode of operation. In either position, steam can be extracted from the heat exchanger for cooling components of the combustion turbine or for power augmentation of the combustion turbine.

4 Claims, 3 Drawing Sheets

HEAT EXCHANGER FOR OPERATING WITH A COMBUSTION TURBINE IN EITHER A SIMPLE CYCLE OR A COMBINED CYCLE

BACKGROUND OF THE INVENTION

This invention relates to improved heat exchangers and systems that employ the improved heat exchangers. This invention also relates to methods of using the improved heat exchangers.

Combustion turbines generally include a compressor, a combustor and a turbine section. The compressor compresses air, and the air is directed to the combustor. In the combustor, the air is mixed with fuel, and this mixture is burned to produce a hot gas. The hot gas is sent through the turbine section where a portion of the energy in the hot gas is converted into useful work. This work may include rotation of a shaft which drives a load, such as an electrical generator. After traveling through the turbine section, the hot gas is exhausted from the combustion turbine.

Combustion turbines generally have cooling systems. These cooling systems may be used to cool various components of the combustion turbine, such as the combustor and the vanes disposed in the turbine section. Although various cooling mediums may be used, typically either steam or air is used as the cooling medium. These cooling systems may be closed loop type cooling systems or opened loop type cooling systems. In closed loop type cooling systems, the cooling medium is continuously circulated through the components to be cooled. In contrast, in open loop type cooling systems the coolant is circulated through the component to be cooled a single time.

Generally, combustion turbines may be operated in either the simple cycle mode of operation or the combined cycle mode of operation. In the simple cycle mode of operation, most of the hot gas exhausted from the turbine section of the combustion turbine is exhausted to the atmosphere. However, a portion of the hot gas exhausted from the combustion turbine is directed to a once through steam generator where its heat is transferred to a cooling medium, which may be water or steam. This heated cooling medium can be used by the combustion turbine cooling systems to cool components of the combustion turbine.

Conversely, in the combined cycle mode of operation the hot gas exhausted from the combustion turbine is sent to a heat recovery steam generator. In this heat recovery heat exchanger, heat is transferred from the hot gas to a cooling medium. The heated cooling medium may then be used to drive a steam turbine and in the combustion turbine cooling systems to cool components of the combustion turbine.

In these prior art combustion turbines, a separate heat exchanger was used to extract heat from the hot gas exhausted from the turbine section of the combustion turbine depending on whether the combustion turbine is operated in either a simple or a combined cycle mode of operation. This invention relates to heat exchangers that can be used when the combustion turbine is operated in either the simple cycle mode or the combined cycle mode of operation. This invention also relates to combustion turbine systems and methods of operating combustion turbines with heat exchangers of this invention.

SUMMARY OF THE INVENTION

An improved heat exchanger of this invention includes a first heat transfer stage, a second heat transfer stage, a bypass stack and a damper. The damper and the bypass stack are preferably disposed between the first and the second heat transfer stages. Each of the heat transfer stages preferably has a plurality of tubes through which a cooling medium can flow. Hot fluid can be received into the heat exchanger and directed through the heat transfer stages where heat is transferred from the hot fluid to the cooling medium flowing through the tubes of the heat transfer stages.

Preferably, the hot fluid enters the heat exchanger upstream of the first heat transfer stage. After flowing through the first heat transfer stage, the hot fluid can be directed by the damper to either the bypass stack or the second heat transfer stage. In order to direct the hot gas, the damper may have at least two positions, a first position and a second position. In the first position, the hot fluid exiting the first heat transfer stage is directed through the bypass stack and does not enter the second heat transfer stage. After flowing through the bypass stack, the hot fluid exhausts to atmosphere. Conversely, when the damper is in the second position, hot fluid exiting the first heat transfer stage is directed to the second heat transfer stage and not through the bypass stack.

The heat exchanger of this invention may be employed in a combustion turbine system that generally includes a compressor, a combustor, a turbine section and a steam turbine. The compressor produces compressed air for mixing with fuel in the combustor. The combustor receives fuel and compressed air from the compressor and burns them to produce a hot gas. This hot gas flows through the turbine section where its energy is converted into useful energy in the form of rotation of a shaft. From the turbine section of the combustion turbine, the hot gas is exhausted into the heat exchanger of this invention.

If a simple cycle mode of operation is desired, the damper can be placed in its first position. Conversely, if a combined cycle mode of operation is desired and steam is therefore needed to drive a steam turbine, then the damper can be placed in its second position. When the damper is in the first position, the first heat transfer stage produces steam that can be used to cool components of the combustion turbine and/or to augment the power output of the combustion turbine. The components of the combustion turbine that may be cooled by the cooling steam may include components of the combustor and the turbine section. If the steam is to be used for power augmentation, it can be directed into the combustor shell of the turbine and combined with fuel in the combustor to produce a hot gas from which useful energy can be extracted.

In its second position, the first heat transfer stage receives steam produced from the second heat transfer stage and the steam is superheated in the first heat transfer stage. This superheated steam may be used to drive the steam turbine of a combined cycle combustion turbine. Cooling steam for the combustion turbine or steam for augmenting the power output of the combustion turbine may be bled off of the second heat transfer stage when the damper is in the second position. Thus, the heat exchanger of this invention can be used with a combustion turbine to produce either cooling steam for the combustion turbine or steam for power augmentation when it is operated in either the single or combined cycle mode of operation and to produce steam to drive a steam turbine when the combustion turbine is operated in the combined cycle mode of operation.

The heat exchanger of this invention may also have a connecting conduit disposed between the first and the second heat transfer stages. A valve may be disposed in the connecting conduit between the first and the second heat transfer stages. When operated in the simple cycle mode of operation, the valve may be closed so that the cooling medium does not flow between the first and second heat transfer stages. If the heat exchanger is operated in the combined cycle mode of operation, the valve may be opened so that the cooling medium may flow from the second heat transfer stage to the first heat transfer stage.

Other features of this invention are described below.

BRIE DESCRIPTION OF THE DRAWINGS

DETAILED DESCRIPTION OF THE PREFERRED EMBODIMENTS

Figure 1:
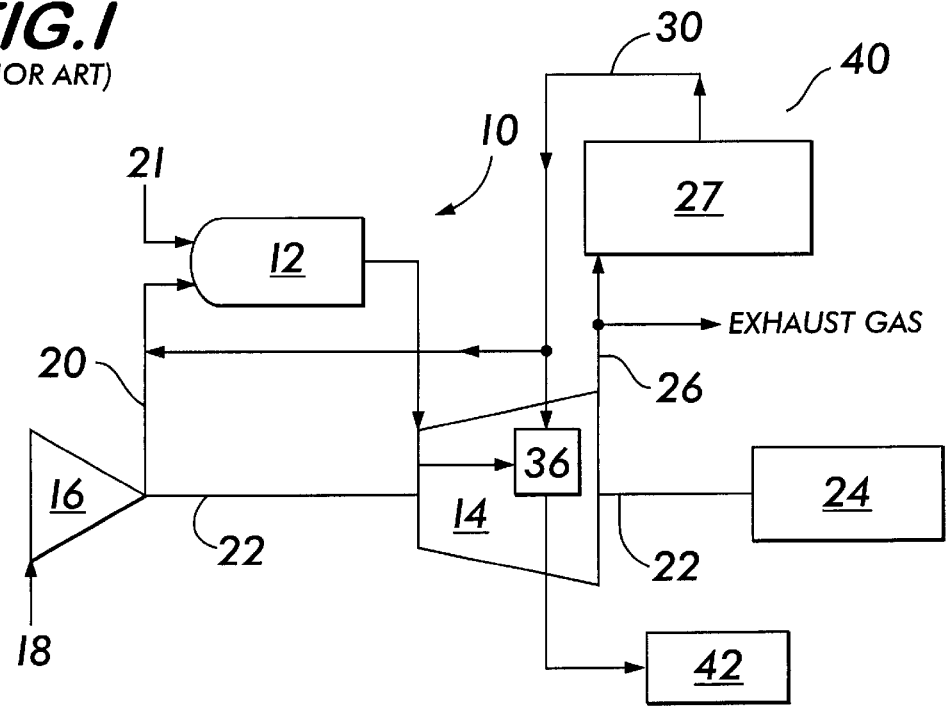
FIG. 1 is a schematic diagram of a prior art system in which this invention may be employed.
Figure 2:
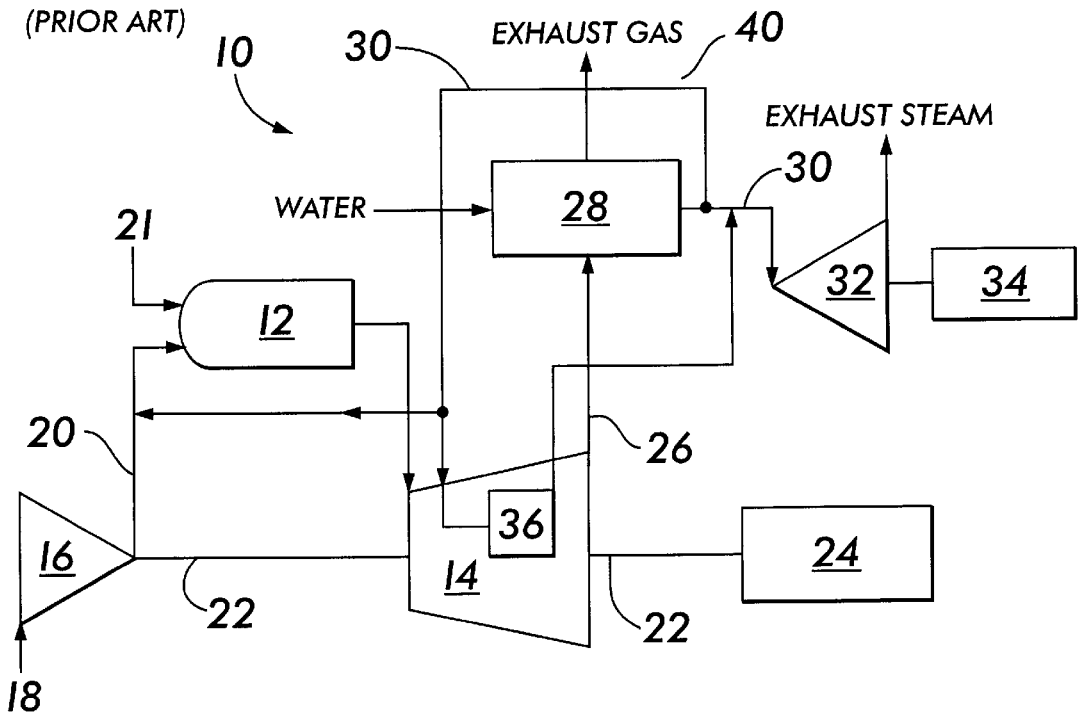
FIG. 2 is a schematic diagram of a prior art system in which this invention may be employed.

As shown schematically in FIGS. 1 and 2, a combustion turbine 10 generally includes a combustor 12, a turbine section 14 and a compressor 16. As will be appreciated by those skilled in the art, a combustion turbine 10 is typically referred to as either a simple cycle turbine or a combined cycle turbine. Consequently, the operation of the compressor 16, the combustor 12 and the turbine section 14 will be discussed in conjunction with a description of each cycle. In FIG. 1, a schematic diagram of a simple cycle gas turbine is illustrated. Air enters the inlet of the compressor at 18 and is compressed as it travels through the compressor 16. After traveling through the compressor 16, the air 20 enters the combustor 12 where fuel 21, such as natural gas, is burned to produce a hot gas. The hot gas exits the combustor 12 and travels through the turbine section 14. In the turbine section 14 the gas expands, and the energy of the hot gas is converted into work to drive the rotor shaft 22. More specifically, as the rotor shaft 22 turns it may drive the compressor 16 and another load 24. This load 24 is typically an electrical generator. Hot gas 26 is then exhausted from the turbine section 14. In the simple cycle mode of operation, most of the hot gas 26 exhausted from the turbine section 14 is exhausted to atmosphere. If cooling steam is needed for the combustion turbine, a portion of the hot gas 26 is directed to a once through steam generator (OTSG) 27. In this once through steam generator 27, the heat from the hot gas is transferred to a cooling medium to produce steam 30. This steam 30 is then used as a cooling medium for the combustion turbine 10 as described in further detail below. Alternatively, the steam 30 may be used to augment the power output of the combustion turbine 10, as is also described below.

In contrast to the simple cycle gas turbine illustrated in FIG. 1, FIG. 2 depicts a combined cycle combustion turbine. The turbine section 14, the compressor 16 and the combustor 12 of the combined cycle gas turbine operate similarly to those in a simple cycle gas turbine. However, in a combined cycle gas turbine a substantial amount of the energy in the turbine exhaust gas 26 is converted into useful work. For example, as shown in FIG. 2, the exhaust gas 26 may be directed to a heat recovery steam generator (HRSG) 28 to convert water into steam 30. The steam 30 is then used to drive a steam turbine 32 which drives another load 34, such as an electrical generator. Alternatively, the steam 30 may drive the load 24 driven by the turbine section 14. Steam is also extracted from the heat recovery steam generator 28 to provide cooling steam for the combustion turbine and or for augmenting the power output of the combustion turbine. Thus, prior art combustion turbines 10 may employ either or both, a once through steam generator 27 if operated in the single cycle mode of operation and/or a heat recovery steam generator 28 if operated in a combined cycle mode of operation. The once through steam generator 27 is used in the simple cycle mode of operation to produce cooling steam for the combustion turbine and/or steam for augmenting the power output of the combustion turbine. In contrast, the heat recovery steam generator 28 is typically used only when the combustion turbine 10 is operated in the combined cycle mode of operation and is used to produce steam to drive a steam turbine, to cool the combustion turbine 10 and/or to augment the power output of the combustion turbine.

Also by way of background, a combustion turbine 10 has many components that require cooling. These components include, but are not limited to, the combustor 12 and the vanes 36 of the turbine section 14. As will be appreciated by those skilled in the art, traditional methods of cooling these components include both "closed loop" and "open loop" systems. Because these systems are well known, they are not discussed in detail. However, a cooling system 40 employing steam is described so that one application of the heat exchanger 38 of this invention described below may be better understood. FIGS. 1 and 2 depict schematically a closed loop steam cooling system 40 for a combustion turbine 10. As shown steam 30 is produced from either the once through steam generator 27 or the heat recovery steam generator 28 and directed into the components, such as the vanes 36, to be cooled. (Although the steam may be used to cool a variety of turbines components, such as the combustor 12, the explanation of the cooling system 50 is provided with reference to the turbines vanes 36. It will be understood that the steam produced by either the once through steam generator 27, the heat recovery steam generator 28 or the heat exchanger of this invention 38 may be used to cool other components of the combustion turbine 10, and the explanation with reference to the vanes 36 is provided for illustrative purposes and is not intended to be limiting.) In the vanes 36 or other components, the steam is heated and provides the necessary cooling. From the vanes 36, the steam is either exhausted, directed to a second heat exchanger 42, where its energy is extracted, or sent to a steam turbine 32. Thus, the steam 30 provides cooling for the combustion turbine 10.

In addition to providing cooling steam, steam 30 produced by either the once through steam generator 27 or the heat recovery steam generator 28 may be used for augmenting the power output of the turbine 10. Power augmentation is achieved by directing the steam 30, to either the discharge of the compressor 20 or the combustor 12 where it mixes with fuel to produce the hot gas that drives the rotor 22 in the turbine section 14 of the combustion turbine 10. Steam can be used for power augmentation when the combustion turbine is operated in either the simple cycle mode of operation or the combined cycle mode of operation.

What has been described thus far is prior art. The heat exchanger 38 of this invention may be employed with combustion turbine 10 and form part of a combustion turbine heat recovery system 39. Furthermore, the heat exchanger 38 of this invention may also be used with the steam cooling system 40 or be used to produce steam for power augmentation, as described above. As described in detail below, the heat exchanger 38 of this invention provides a single component that can produce steam to drive a steam turbine when the combustion turbine 10 is operated in the combined cycle mode of operation and steam to cool the combustion turbine 10 and/or to augment the power output of the turbine 10 when it is operated in either the simple cycle or combined cycle mode of operation. Thus, the heat exchanger 38 of this invention eliminates the need for having two separate heat exchangers, a once through steam generator 27 and a heat recovery steam generator 28.

Figure 3:
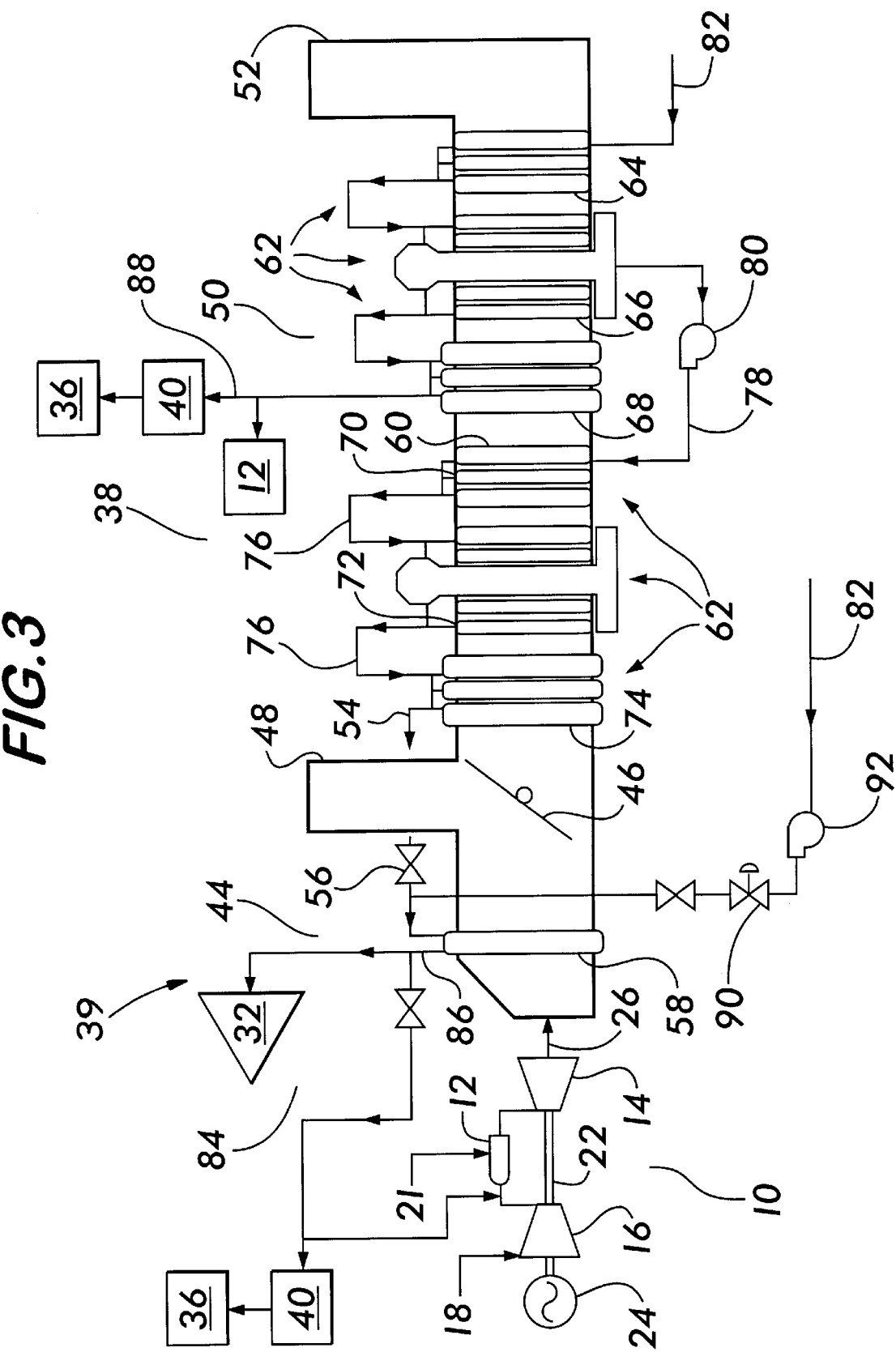
FIG. 3 is a diagrammatical view of a preferred embodiment of this invention.
Figure 4:
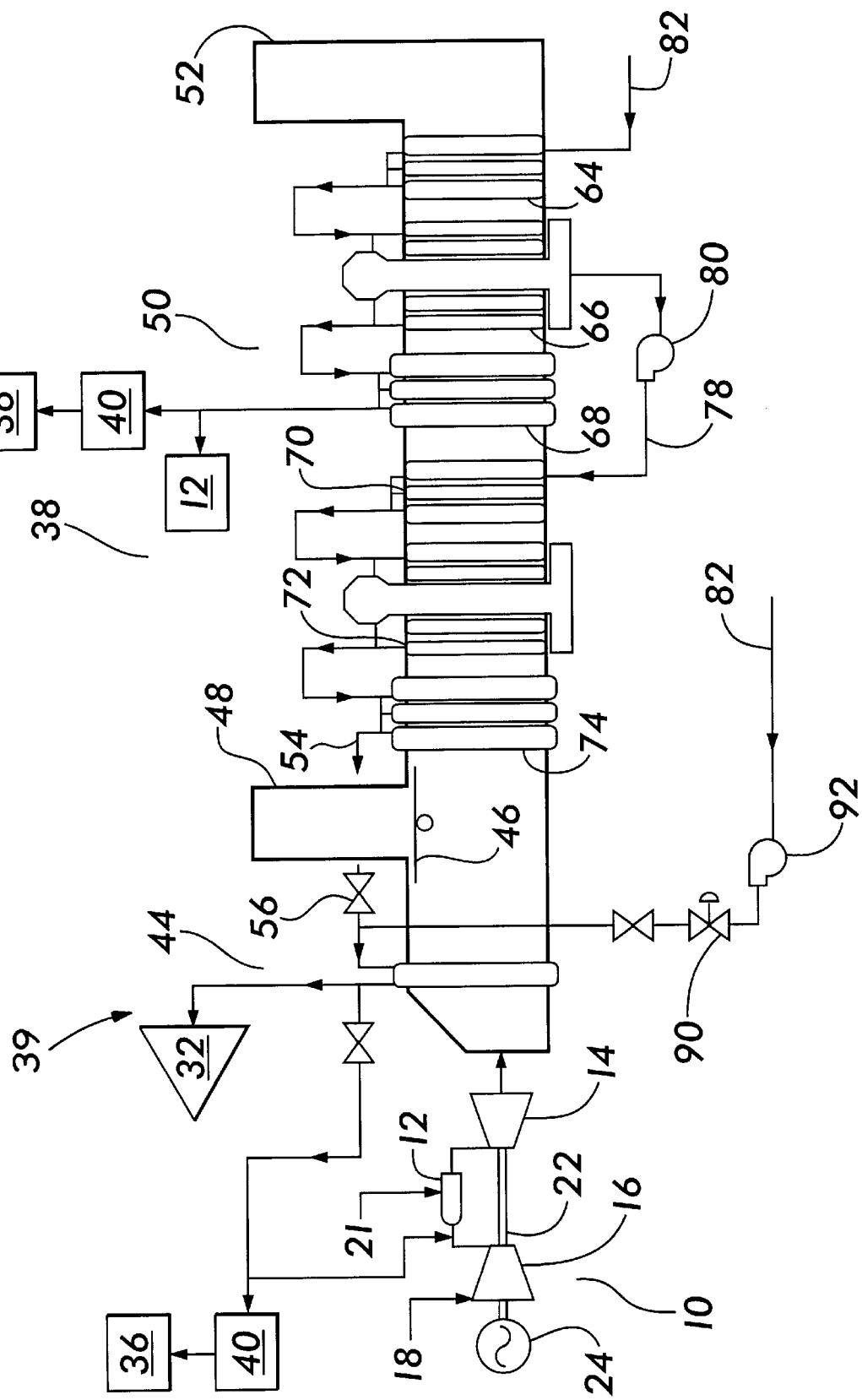
FIG. 4 is a diagrammatical view of the preferred embodiment of FIG. 3.

FIGS. 3 and 4 depict a preferred embodiment of the heat exchanger 38 of this invention. This heat exchanger 38 preferably has a first heat transfer stage 44, a damper 46, a bypass stack 48, a second heat transfer stage 50 and an exhaust stack 52. In addition, the heat exchanger 38 of this invention may also have a connecting conduit 54 for connecting the first heat transfer stage 44 to the second heat transfer stage 50 and a valve 56 disposed in the connecting conduit 54.

As shown, the first heat transfer stage 44 generally consists of a plurality of heat transfer tubes 58 that define a flow path for the cooling medium. Hot fluid from the turbine section 14, described above, can flow from the turbine section 14 to the heat exchanger 38 and flow through the first heat transfer stage over these heat transfer tubes 58. Flowing inside of the heat transfer tubes 58 is a cooling medium which receives heat from the hot fluid as it flows through the tubes. As described below, the cooling medium flowing through the tubes of the first heat transfer stage 44 may be either steam produced by the second heat transfer stage 50 or water from another source. Other appropriate types of fluids (fluids as used herein includes both liquids and gases) may be used as the cooling medium. If water is sent through the first stage heat transfer, the heat from the hot fluid transfers enough heat to the water so that steam is formed. This steam can be used for cooling components of the turbine section 14 or the combustor 12 and/or be used for power augmentation purposes. Conversely, if steam from the second heat transfer stage 50 flows through the tubes of the first heat transfer stage 44, then the steam is superheated in the first heat transfer stage 44. This superheated steam can then be used to drive a steam turbine.

As mentioned above, the heat exchanger 38 may also have a second heat transfer stage 50. Similar to the first heat transfer stage 44, the second heat transfer stage 50 may include a plurality of heat transfer tubes 60 that define a flow path for a cooling medium. A cooling medium may also flow through the plurality of heat transfer tubes 60 of the second heat transfer stage 50. As described below, hot fluid exhausted from the first heat transfer stage 44 flows through the second heat transfer stage 50 and around the outside of the heat transfer tubes 60 in each heat transfer section. As the hot fluid flows through the second heat transfer stage 50, heat is transferred from the hot fluid to the cooling medium. This heat transfer produces steam in the heat transfer tubes 60 of the second heat transfer stage 50.

In a preferred embodiment of this invention, the second heat transfer stage 50 is divided into a plurality of heat transfer sections 62. The sections 62 may generally include a Low Pressure Economizer (LPE) 64, a LP (low pressure) evaporator, an LP (Low Pressure) superheater 68, an HP (high pressure) economizer, an HP (high pressure) evaporator 72 and an HP (high pressure) superheater 74. These sections 62 of the second heat transfer stage 50 are connected by conduits 76 so that the cooling medium may flow from one to another. Preferably, the low pressure economizer 64, the LP evaporator 66 and the LP superheater 68 are connected in series by the conduits. In the LPE 64, the cooling medium may be preheated. After flowing through the LPE 64, the cooling medium may flow to the LP evaporator 66 where it is vaporized in to steam. From the LP evaporator 66, the cooling medium may flow to the LP superheater 68 where it is superheated into LP superheated steam. The LP superheated steam produced in the LP superheater 68 may then exit the second heat transfer stage 50.

The HP economizer 70, the HP evaporator 72 and the HP superheater 74 are preferably connected by conduits in series. A feed conduit 78 may be disposed in the second heat transfer stage 50, and the feed conduit 78 preferably connects the LP evaporator 66 to the HP economizer 70. Therefore, some of the cooling medium may be transferred via the feed conduit 78 from the LP evaporator 66 to the HP economizer 70. A feed pump 80 may be disposed in the feed conduit 78 to provide the impetus to transfer the cooling medium between the LP evaporator 66 and the HP economizer 70. In the HP economizer 70, the cooling medium is preheated. After being preheated, the cooling medium flows to the HP evaporator 72 where it is further heated and vaporized into steam. From the HP evaporator 72, the cooling medium flows to the HP superheater 74 and is superheated. As described in more detail below, the steam flowing through the HP Superheater 74 is exhausted to the first heat transfer stage 44 where it is further superheated.

The heat exchanger 38 may also have a bypass stack 48 and an exhaust stack 52. The bypass stack 48 is disposed between the first heat transfer stage 44 and the damper 46. The exhaust stack 52 is disposed downstream of the second heat transfer stage 50. As described in more detail below, when the damper 46 is in a first position, hot fluid exhausted from the turbine section 14 passes through the first heat transfer stage 44 and is directed by the damper 46 though the bypass stack 48 where it is exhausted to the atmosphere. Conversely, when the damper 46 is in a second position, hot fluid flowing through the first heat transfer stage 44 is diverted by the damper 46 through the second heat transfer stage 50 and away from the bypass stack 48. After flowing through the second heat transfer stage 50, the hot fluid then flows through the exhaust stack 52 where it is exhausted to atmosphere.

The damper 46 is moveable between a first position and a second position. FIG. 3 illustrates the damper 46 in the first position, and FIG. 4 depicts the damper 46 in the second position. In the first position, the heat exchanger 38 permits the combustion turbine 10 to operate in a simple-cycle mode of operation. More particularly, as the hot fluid enters the heat exchanger 38 it flows through the first heat transfer stage 44 and then is directed to the bypass stack 48. As heat is transferred from the hot fluid in the first heat transfer stage 44, steam is produced in the first heat transfer stage 44. This steam may be directed to the turbine cooling systems 40 and employed to cool various components of the combustion turbine 10 and/or be directed to the turbine 10 for power augmentation purposes. However, not all of the heat is extracted from the hot fluid in this first stage, and the hot fluid is exhausted through the bypass stack 48 with a relatively significant amount of energy. This is known as simple-cycle operation. In effect, with the damper 46 in the first position, the heat exchanger 38 functions as a once through steam generator.

With the damper 46 in the position as shown in FIG. 4, the hot fluid enters the heat exchanger 38 and flows through the first heat transfer stage 44. However, once the damper 46 is reached, the hot fluid is directed to the second heat transfer stage 50. In the second heat transfer stage 50, the hot fluid produces steam, and a significant amount of energy is extracted from the hot fluid in this stage. After exiting the second heat transfer stage 50, the hot fluid is exhausted through the exhaust stack 52. In this mode of operation, steam is produced in the second heat transfer stage 50. This steam, as described in more detail below, is diverted from the second heat transfer stage 50 via the connecting conduit 54 to the first heat transfer stage 44. In the first heat transfer stage 44, the steam is superheated by the hot fluid and is then exhausted. Once exhausted the superheated steam can be used to produce usable work. For example, the superheated steam can be used to drive a steam turbine 32. Because the energy from the hot fluid is being used to drive another turbine in this mode of operation, it is known as a combined cycle mode of operation. As is described in more detail below, in the combined cycle mode of operation, cooling steam for the combustion turbine 10 and/or steam for power augmentation purposes can be extracted via a steam outlet 88 from the second heat transfer stage 50.

In summary, by employing a damper 46 in the heat exchanger 38 in between a first heat transfer stage 44 and a second heat transfer stage 50, the heat exchanger 38 can be used when the combustion turbine 10 is operated in the combined cycle mode of operation and when the combustion turbine 10 is operated in the single cycle mode of operation. By positioning the damper 46, the heat exchanger 38 can produce either cooling steam for the combustion turbine 10 or steam for power augmentation purposes in a simple cycle mode of operation, and superheated steam for driving a steam turbine, and either or both cooling steam for a combustion turbine 10 and/or steam for power augmentation purposes in the combined cycle mode of operation. Therefore, the heat exchanger 38 of this invention can be used in either mode of operation of a turbine system. In contrast, in prior art combustion turbines 10 separate heat exchangers 38 were employed for operating the combustion turbines 10 in the simple cycle and in the combined cycle mode of operations. Separate heat exchangers were needed in the prior art because neither could be manipulated to function as the other one. Since the heat exchanger of this invention can function in either mode of operation, it minimizes the number of heat exchangers needed in a combustion turbine to operate in both the simple cycle and the combined cycle modes of operation.

The heat exchanger 38 may have a plurality of conduits and valves for connecting the first and second heat transfer stages 44, 50 to either the steam turbine or the steam cooling system 40 of the combustion turbine 10. These conduits may include the connecting conduit 54 that connects the first heat transfer stage 44 to the second heat transfer stage 50. As alluded to above, a valve 56 may also be disposed in the connecting conduit 54. Further, the heat exchanger 38 may have a supply conduit 82 connected to the first heat transfer stage 44, and a steam outlet 84 attached to the first heat transfer stage 44. Affixed to the outlet of the first heat transfer stage 44 may be an outlet conduit 86 for directing the outlet of the first heat transfer stage 44 to either the steam cooling system 40 for the combustion turbine 10 or the steam turbine 32. A steam outlet 88 may also be connected to an outlet of the second heat transfer stage 50 for providing cooling steam to the combustion turbine cooling system 40.

These valves and conduits enable the heat exchanger 38 to supply steam to either the steam turbine 32 for producing power or the combustion turbine 10 for cooling purposes and/or power augmentation purposes depending on whether the heat exchanger 38 is operating in either the combined cycle or the simple cycle mode of operation. As described above, if the steam turbine is operated in the simple cycle mode and the damper 46 is in the first position, steam produced by the combustion turbine 10 is sent through the first heat transfer stage 44 and is exhausted through the bypass stack 48. When operated in the simple cycle mode, steam is not directed to the steam turbine 32. However, cooling steam and/or steam for power augmentation is needed for the combustion turbine 10. This steam is produced by the first heat transfer stage 44. In order to produce steam in the simple cycle mode of operation, the valve disposed in the connecting conduit 54 between the first and the second heat transfer stages 44, 50 is shut. This prevents the flow of cooling medium between the first and second heat transfer stages 44, 50. The supply conduit 82 supplies the cooling medium to the first heat transfer stage 44. In the first heat transfer stage 44, the cooling medium is heated and transforms into steam. After the cooling medium is transformed into steam, it exits the first heat transfer stage 44 via the outlet conduit 86. From the outlet conduit 86, the steam is directed to either or both the steam cooling system 40 of the combustion turbine 10 to cool various components of the combustion turbine 10 and/or the combustor 12 for power augmentation. Thus, in the simple cycle mode of operation, the first heat transfer stage 44 produces cooling steam and/or steam for power augmentation; steam for the steam turbine is not produced, and the second heat transfer stage 50 is not functional.

The supply conduit for the first heat transfer stage 44 may have at least one supply valve 90 and a supply pump 92. The supply pump 92 provides the impetus for the cooling medium to be transferred to the first heat transfer stage 44, and the valve 90 controls the flow of the cooling medium to the first heat transfer stage 44. In the simple cycle mode of operation, the supply pump 92 is operated and the supply valve 90 is opened, so that the cooling medium may be supplied to the first heat transfer stage 44. Preferably, the source of the cooling medium is boiler feed water of the combustion turbine 10.

When operated in the combined cycle mode of operation, the valve disposed in the connecting conduit 54 between the first and the second heat transfer stages 44, 50 is opened. In addition, the flow of cooling medium to the first heat transfer stage 44 from the supply conduit 82 to the first heat transfer stage 44 is stopped. This occurs by shutting the supply valve 90 and placing the supply pump 92 in the off position. The cooling medium is supplied to the second heat transfer stage 50 via a supply conduit 82 attached to it. In the combined cycle mode of operation, the cooling medium traverses the second heat transfer stage 50 and steam is extracted through the low pressure steam outlet. This steam may be diverted to the cooling system of the combustion turbine 10 and/or the combustor for power augmentation of the combustion turbine. In the combined cycle mode of operation, steam is also produced in the superheater section of the second heat transfer stage 50. This superheated steam exits the second heat transfer stage 50 via the connecting conduit 54. The cooling medium then flows through the connecting conduit 54 and the valve 56 disposed in the connecting conduit 54 to the first heat transfer stage 44. In the first heat transfer stage 44, the cooling medium is again heated and becomes even more superheated. After traversing through the first heat transfer stage 44, the steam exits via the outlet conduit and is directed to the steam turbine 32. In the steam turbine 32, the energy of the cooling medium is converted into work.

When operated in the combined cycle mode of operation, cooling steam for the cooling systems is produced from the LP superheater 60 in the second heat transfer stage 50. This steam exists the LP superheater 68 at the steam outlet 88 and is directed to the cooling systems 40 and the components to be cooled, such as the turbine vanes 36. Similarly, if steam is needed for power augmentation, steam exhausted from the LP superheater 60 via the steam outlet 88 is directed to the combustor 12.

In summary, the heat exchanger 38 of this invention supplies steam produced by the second and the first heat transfer stages 44, 50 to the steam turbine in the combined cycle mode of operation. Cooling steam and/or steam for power augmentation in the combined cycle mode of operation is produced in the second heat transfer stage 50 and is diverted to the combustion turbine cooling system 40. As described above, in the combined cycle mode of operation, the damper 46 is in the second position, so that the bypass stack 48 is shut and the hot gas passes through the first and the second heat transfer stages 44, 50. After traversing through the first and the second heat transfer stages 44, 50, the hot gas exits the heat exchanger 38 via the exhaust stack 52. In contrast, in the simple cycle mode of operation, cooling steam and/or steam for power augmentation is produced, but steam for the steam turbine 32 is not. This is accomplished by placing the damper 46 in its first position. Hot gas from the combustion turbine 10 flows through the first heat transfer stage 44 and the bypass stack 48; the hot gas does not flow through the second heat transfer stage 50. In the first heat transfer stage 44, cooling steam for the cooling system 40 of the combustion turbine 10 and/or steam for augmenting the power output of the combustion turbine 10 is produced.

Because the heat exchanger 38 can function in both the combined cycle and simple cycle modes of operation, the operating flexibility of the heat exchanger 38 is enhanced. Instead of being operational in a single mode, the heat exchanger 38 can function in at least two modes of operation. Furthermore, by providing a single component that can function in both modes of operation, the heat exchanger 38 of this invention, eliminates the need for two components, one to operate in each mode. This minimizes capital costs associated with having two separate systems.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of operating exchanger in a combustion turbine system, comprising:

providing a heat exchanger that has a bypass stack disposed between a first heat transfer stage having a first coolant fluid conduit and a second heat transfer stage having a second coolant fluid conduit, wherein the first and second coolant conduits are connected in series with a first isolation valve disposed there between, a damper disposed between the second heat transfer stage and the bypass stack, a first bleed line in the first coolant fluid conduit for directing a portion of coolant flowing through the first coolant conduit to a cooling circuit within a component of the combustion turbine system when in an open position, a second bleed line in the second coolant fluid conduit for directing a portion of coolant flowing through the second coolant conduit to the cooling circuit within the component of the combustion turbine system when in an open position, a first feed water circuit for circulating coolant in the first coolant fluid conduit, a second feed water circuit for circulating coolant in the second coolant fluid conduit, and a second isolation valve in the first feed water circuit for isolating the first feed water circuit from the first coolant fluid conduit when in the closed position;

positioning the damper in a first position to direct a hot gas flowing from the first heat transfer stage and the bypass stack, opening the second isolation valve and the first bleed line, and closing the first isolation valve, so that feed water circulates in the first coolant conduit is converted to steam which is conveyed to the cooling circuit of the turbine system component and/or used for power augmentation when the heat exchanger is employed in the combustion turbine system operating in a simple cycle; and positioning the damper in a second position to direct hot gas flowing from the first heat transfer stage to the second heat transfer stage, closing the second isolation valve and the first bleed line, and opening the first isolation valve so that steam generated in the second coolant conduit can be directed to the cooling circuit of the turbine system component and/or used for power augmentation and steam generated in the first coolant conduit can be used to drive a steam turbine when the heat exchanger is employed in the combustion turbine system operating in a combined cycle.

2. A combustion turbine heat recovery system, comprising:

a compressor for producing compressed air;

a combustor for combusting a mixture of fuel and compressed air produced by the compressor to produce a hot gas:

a heat exchanger comprising;

(i) a first heat transfer stage for transferring heat from the hot gas to a first coolant fluid conduit when the hot gas flows through the heat exchanger;

(ii) a second heat transfer stage for transferring heat to a second coolant fluid conduit from the hot gas when the hot gas flows through the second stage of the heat exchanger, wherein the first and second coolant fluid conduits are connected in series;

(iii) a bypass stack, disposed between the first heat transfer stage and the second heat transfer stage, for exhausting the hot gas before it enters the second stage;

(iv) a damper, disposed between the first heat transfer stage and the second heat transfer stage, for moving between a first position in which the hot gas is directed through the bypass stack after the hot gas flows through the first heat transfer stage and a second position in which the hot gas is directed through the second heat transfer stage after it flows through the first heat transfer stage;

(v) a first isolation valve connected between the first and second coolant conduits for isolating the first coolant conduit from the second coolant conduit when in a closed position (vi) a first bleed line in the first coolant fluid conduit for directing a portion of coolant flowing through the first coolant conduit to a cooling circuit within a component of the combustion turbine when in an open position; and (vii) a second bleed line in the second coolant fluid conduit for directing a portion of coolant flowing through the second coolant conduit to the cooling circuit within the component of the combustion turbine when in an open position.

3. The combustion turbine heat recovery system of claim 2 wherein the coolant flowing through the first and second conduits flows in a counterflow direction to that of the hot gas flowing through the heat exchanger.

4. The combustion turbine heat recovery system of claim 2 further comprising a first feed water circuit for circulating coolant in the first coolant fluid conduit, a second feed water circuit for circulating coolant in the second coolant fluid conduit, and a second isolation valve in the first feed water circuit for isolating the first feed water circuit from the fist coolant fluid conduit when in the closed position.

* * * * *